United States Patent
Mitchell

(10) Patent No.: US 6,355,990 B1
(45) Date of Patent: Mar. 12, 2002

(54) POWER DISTRIBUTION SYSTEM AND METHOD

(75) Inventor: Daniel M. Mitchell, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 09/275,297

(22) Filed: Mar. 24, 1999

(51) Int. Cl.⁷ .................................................. H02J 7/00
(52) U.S. Cl. ........................... 307/64; 307/66; 307/43; 307/18; 307/19; 307/125; 320/124; 323/313
(58) Field of Search ............................... 307/18, 19, 20, 307/31, 33, 43, 145, 139, 131, 126, 69, 64, 109, 66, 41, 125; 323/313; 320/124, 15; 363/21; 324/416

(56) References Cited

U.S. PATENT DOCUMENTS

| | | | | |
|---|---|---|---|---|
| 4,016,474 A | * | 4/1977 | Mason | 320/15 |
| 5,694,308 A | * | 12/1997 | Cave | 363/59 |
| 5,844,787 A | * | 12/1998 | Fraidlin et al. | 363/21 |
| 6,075,295 A | * | 6/2000 | Li | 307/39 |
| 6,091,232 A | * | 7/2000 | Criscione et al. | 323/222 |

* cited by examiner

Primary Examiner—Fritz Fleming
Assistant Examiner—Robert L. Deberadinis
(74) Attorney, Agent, or Firm—Nathan O. Jensen; Kyle Eppele

(57) ABSTRACT

A power distribution system and method, including a direct-current current source which is commutated among a number of distribution circuits which function as independent and modular power sources. Each distribution circuit includes a capacitor which is connected to the direct-current current source through a switch. The load is connected in parallel with the capacitor. The capacitor is charged to a predetermined level, generally matching the required load voltage, and periodically checked and recharged as necessary. There may be a plurality of distribution circuits to provide power to separate circuits or specific portions of a larger circuit. By varying the switch timing and logic, the output voltage of each distribution circuit may be varied, allowing a centralized power supply to provide power to a variety of electrical components with varying voltage requirements.

14 Claims, 9 Drawing Sheets ically identified, are achieved generally by the present
POWER DISTRIBUTION SYSTEM AND METHOD The present invention relates to a system and method for distributing power to circuit elements, and more specifically, to a central current source which is commutated among a number of energy storage devices, such as capacitors, which function as independent power sources.

BACKGROUND OF THE INVENTION

There are electrical applications in which a number of independent and varying power supplies are necessary. For instance, in printed circuit boards, there are usually a variety of components and sub-circuits which require independent power supplies. Separate power supplies are required for a variety of reasons, such as varying voltage requirements, noise and isolation concerns, etc. Generally, the voltage requirements in integrated circuits are relatively small, ranging between 5 volts to 0.50 volts. In light of the low operational voltages of such circuits, voltage deviations on the power supply line due to phenomena such as source variations, load variations, and electrical noise, can be a significant portion of the output voltage and can cause operational problems. Also, given the trend of electronic circuits becoming smaller in physical dimensions, it is becoming increasingly impractical to use multiple power supplies which would limit the extent to which printed circuit boards can be reduced in size.

Therefore, there is a need for a power distribution system and method which can be utilized to provide separately regulated power to multiple loads with a variety of voltage requirements while reducing the number of required power supplies.

SUMMARY OF THE INVENTION

Accordingly, an object of the present invention is to provide a novel power distribution system and method in which a single power source can distribute power to multiple loads with varying voltage requirements.

Another object of the present invention is to provide a novel power distribution system and method in which the reliability of the individual load output voltages is enhanced by reducing electrical noise and interference.

A further object of the present invention is to provide a novel power distribution system which will increase power efficiency.

In accordance with one embodiment of the present invention, all of these objects, as well as others not herein specifically identified, are achieved generally by the present power distribution system and method in which a centralized current source is commutated among multiple energy storage devices, such as capacitors, which are connected in parallel with their respective loads.

More specifically, one embodiment of the present invention includes a switching regulated current source which is sequentially connected in parallel circuit arrangement with a number of load capacitors, each capacitor being connected to the current source through a switch. Each capacitor is connected to a load and can be charged to predetermined voltages during its charging time slot, thereby providing power to each load. The capacitors can be charged to varying voltages, allowing for a single current source to provide a number of output load voltages. The frequency and duration of the switch operations can be varied to enhance efficiency of the power distribution or to accommodate the particular requirements of the electrical system. Further, additional circuit arrangements can be utilized to enhance the efficiency and enhance isolation of each distribution circuit.

Because a significant portion of a switching regulator's power losses are independent of load, this approach achieves higher efficiency as well as smaller size in comparison to using multiple individual power supplies for each output voltage requirement.

BRIEF DESCRIPTION OF THE DRAWINGS

Further objects of the invention, taken together with additional features contributing thereto and advantages occurring therefrom, will be apparent from the following description of the invention when read in conjunction with the accompanying drawings, wherein.

DETAILED DESCRIPTION OF THE INVENTION

Figure 1A:
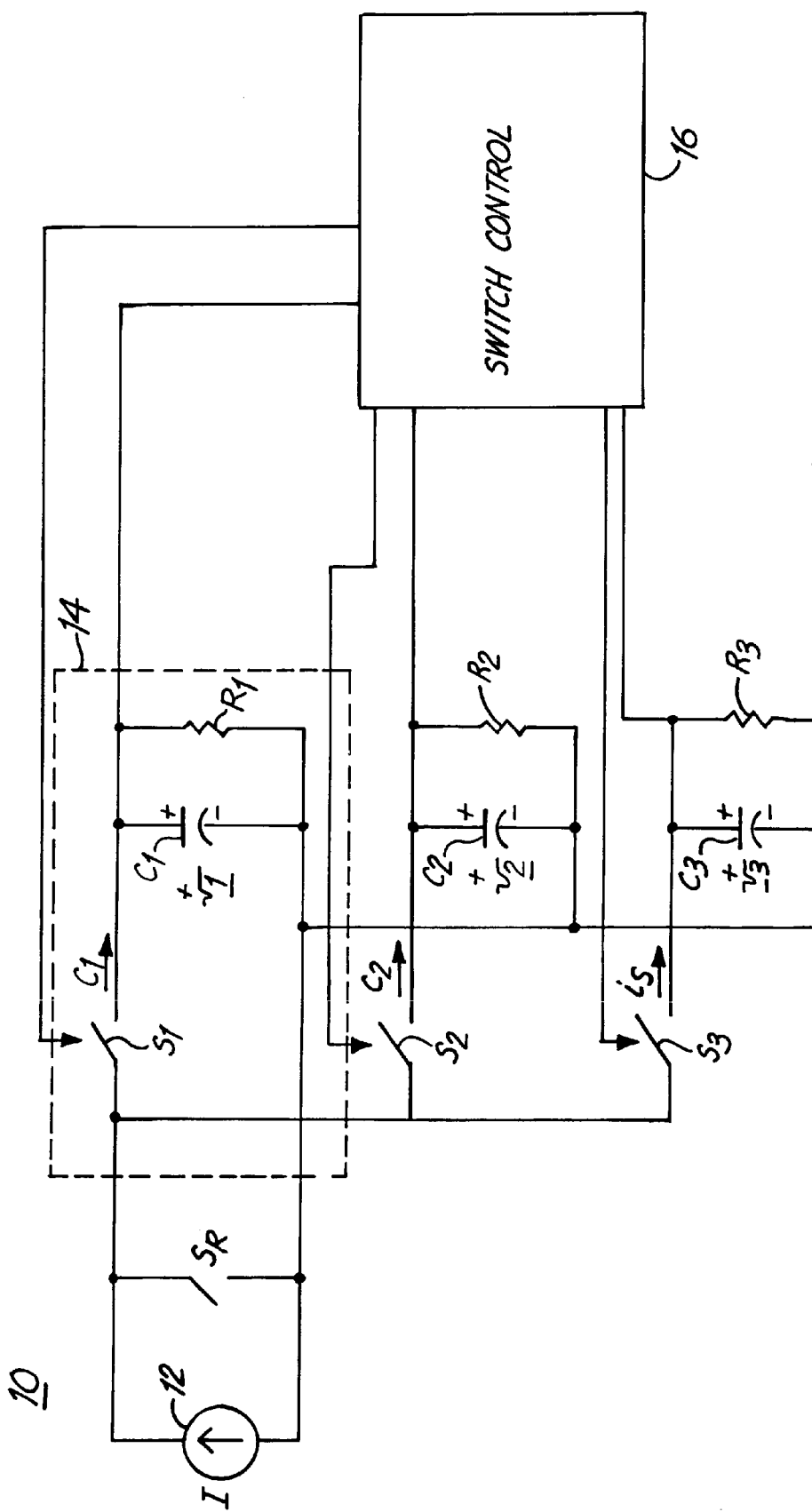
FIG. 1A is a schematic circuit diagram of an embodiment of a power distribution system in accordance with the present invention.

Referring to FIG. 1A, an embodiment of the present power distribution system is shown and generally designated as 10. The power distribution system 10 includes a direct-current ("DC") current source 12 and at least one distribution circuit 14 shown as the elements encompassed by the broken lines. Each distribution circuit 14 of the embodiment of FIG. 1A includes a switch $S_1$, $S_2$, $S_3$, and a capacitor $C_1$, $C_2$, $C_3$, respectively. Load resistors $R_1$, $R_2$, $R_3$ are included in the diagram for the purposes of explanation. With respect to the first distribution circuit 14, the capacitor $C_1$, the load resistor $R_1$, and the DC current source 12 are in parallel circuit arrangement with each other. The switch $S_1$ is connected in series between the output of the current source 12 and the positive terminal of the capacitor $C_1$. As can be seen in FIG. 1A, the additional distribution circuits 14 are configured similarly.

Each distribution circuit 14 can provide a separate and distinct voltage to an electrical load $R_1$, $R_2$, $R_3$, and each load would be provided with the load voltages of $v_1$, $v_2$, or $v_3$, respectively. The value of the load voltages $v_1$, $v_2$, and $V_3$ can be varied by the amount of charge provided to the capacitors $C_1$, $C_2$, and $C_3$.

In the embodiment of FIG. 1A, a Switch Control 16 is used to control the operations of the switches $S_1$, $S_2$, and $S_3$. A variety of circuit functions can be utilized in the Switch Control 16 to control the switching of switches $S_1$, $S_2$, and $S_3$. These circuit functions can include Schmitt triggers, control logic circuits, and clock circuits.

Predetermined reference voltages are selected for each distribution circuit, $V_{Ref1}$, $V_{Ref2}$, and $V_{Ref3}$, which represent the desired output load voltages to which the capacitors, $C_1$, $C_2$, and $C_3$, respectfully, are charged. The actual voltages across the capacitors, $C_1$, $C_2$, and $C_3$, are designated as $v_1$, $v_2$, and $V_3$, respectfully.

Figure 3:
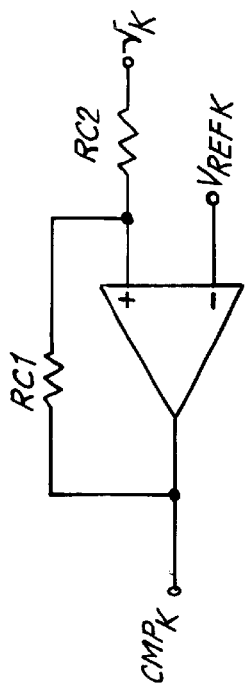
FIG. 3 is an example of a Schmitt trigger comparator circuit arrangement for comparing the energy storage device voltage to its reference voltage.

A Schmitt comparator circuit arrangement, as shown in FIG. 3, is an example of a circuit that may be used to compare the actual voltages ($v_1$, $v_2$, and $V_3$) across the capacitors with the predetermined voltages, $V_{Ref1}$, $V_{Ref2}$, and $V_{Ref3}$, respectively. In FIG. 3, $v_k$ and $V_{Refk}$ are compared to produce and output $cmp_k$, where the index "k" represents the distribution circuit number. When $v_k$ is less than $V_{Refk}$, the output $cmp_k$ is low. If $v_k$ is not less than $V_{Refk}$, then the output is high.

Figure 1B:
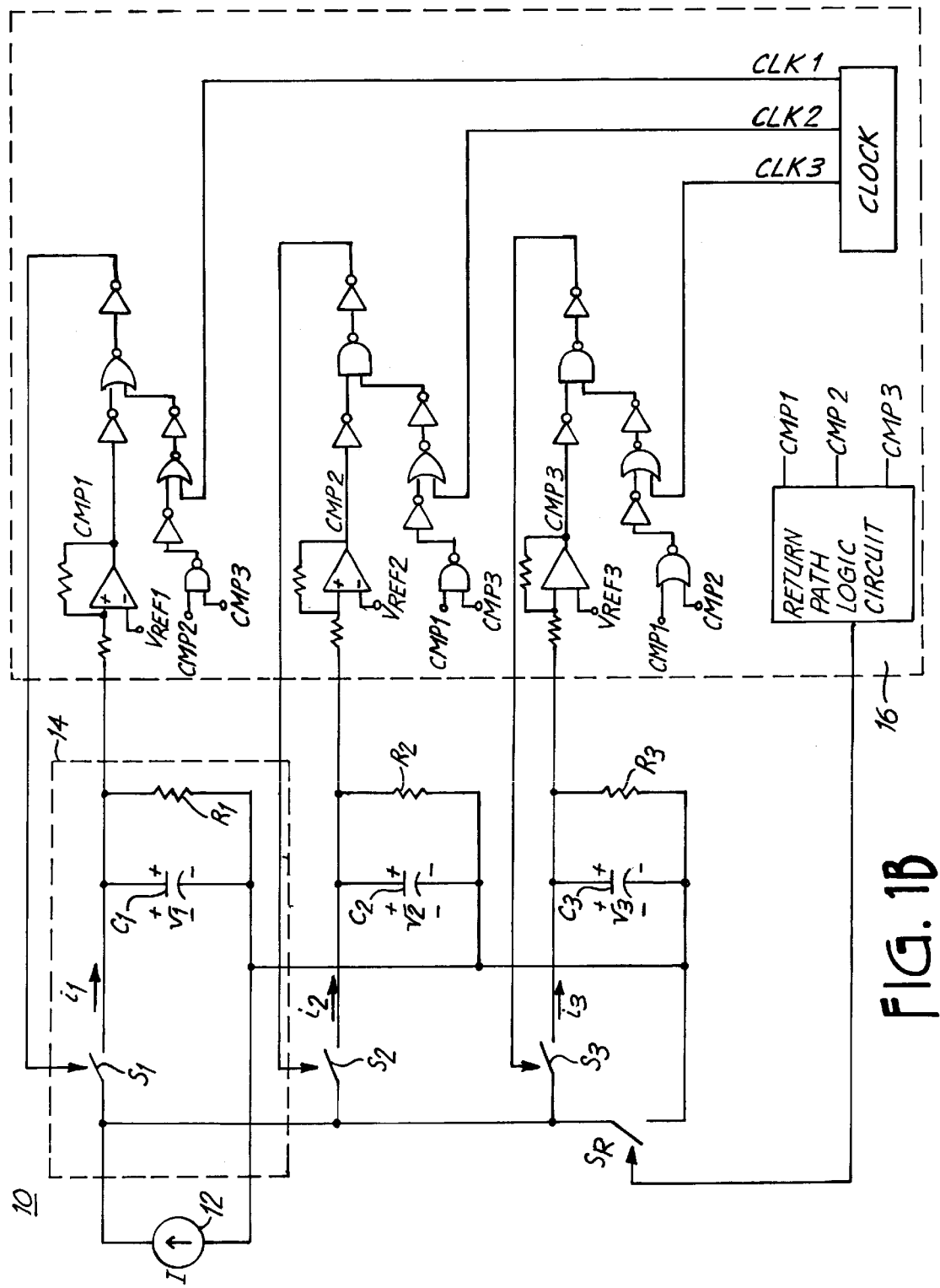
FIG. 1B is a schematic circuit diagram of the embodiment of a power distribution system of FIG. 1A further showing the details of an exemplary switch control circuit in accordance with the invention.

FIG. 1B depicts the circuit of FIG. 1A illustrating an embodiment of the Switch Control 16 in more detail, incorporating a Schmitt trigger comparator and showing a more detailed view of the logic circuits. Referring to the first distribution circuit of FIG. 1B, during its clock cycle, the voltage $v_1$ across capacitor $C_1$ is compared to its reference voltage $V_{Ref1}$ by the Schmitt trigger comparator having an output of $cmp_1$ to determine whether charging is required. If $v_1$ is sufficiently less than $V_{Ref1}$, switch $S_1$ is activated by the logic circuit to allow charging of the capacitor $C_1$. During the next clock cycle, the second distribution circuit, comprised of switch $S_2$ and capacitor $C_2$ is examined in the same manner as the first distribution circuit. The frequency of the clock cycle is preferably selected to be relatively high with respect to the charge and discharge rates of the capacitors $C_1$, $C_2$, and $C_3$. A relatively higher clock cycle frequency is chosen to eliminate the possibility of one capacitor fully discharging while another capacitor is being charged.

Figure 2:
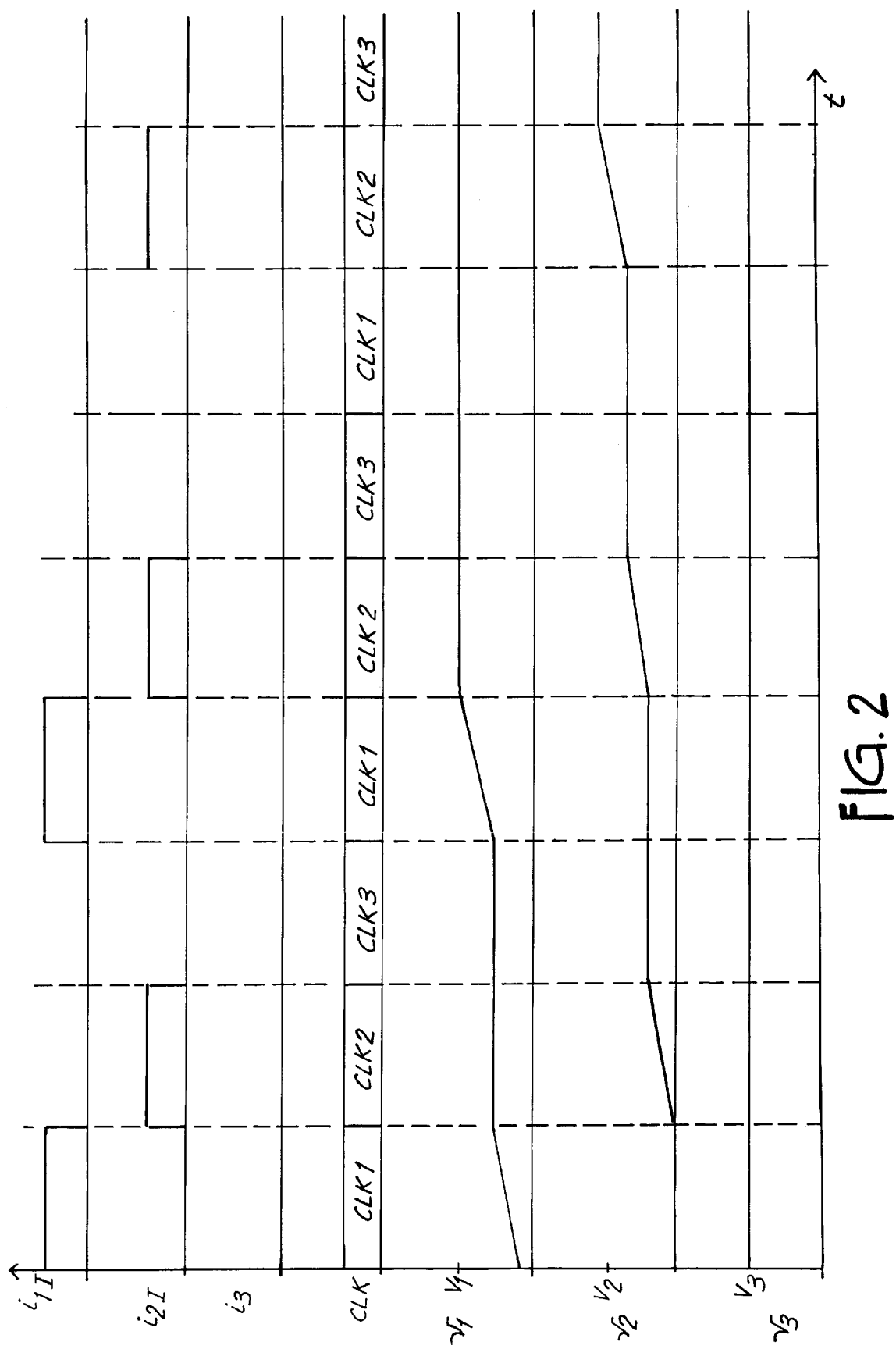
FIG. 2 is a chart showing various illustrative values of current and voltage over time.

A chart representing an example of a sequential mode of operation is presented in FIG. 2, wherein CLK is the clock cycle, and the designations of $clk_1$, $clk_2$, and $clk_3$ represent sequential clock cycles in which the first, second and third distribution circuits are being examined, respectively. During the initial clock cycle, $v_1$ is compared with $V_{Ref1}$ by the Schmitt Trigger comparator. Since $v_1$ is less than $V_{Ref1}$, switch $S_1$ is activated and $v_1$ rises during this cycle. In the second clock cycle, switch $S_1$ is deactivated and $v_2$ is compared with $V_{Ref2}$. Since $v_2$ is less than $V_{Ref2}$, switch $S_2$ is activated, allowing $v_2$ to increase. During the third clock cycle, switch $S_2$ is deactivated and $v_3$ is compared to $V_{Ref3}$. Since $v_3$ is already equal to $V_{Ref3}$, meaning that the capacitor $C_3$ is fully charged to the predetermined level, switch $S_3$ is not activated and no charging takes place. The cycles then repeat. The present power distribution system 10 has been described with three distribution circuits 14 for the purposes of explanation in FIGS. 1A, 1B, and 2. However, in principle, any number of distribution circuits 14 may be utilized in this power distribution system.

Figure 4:
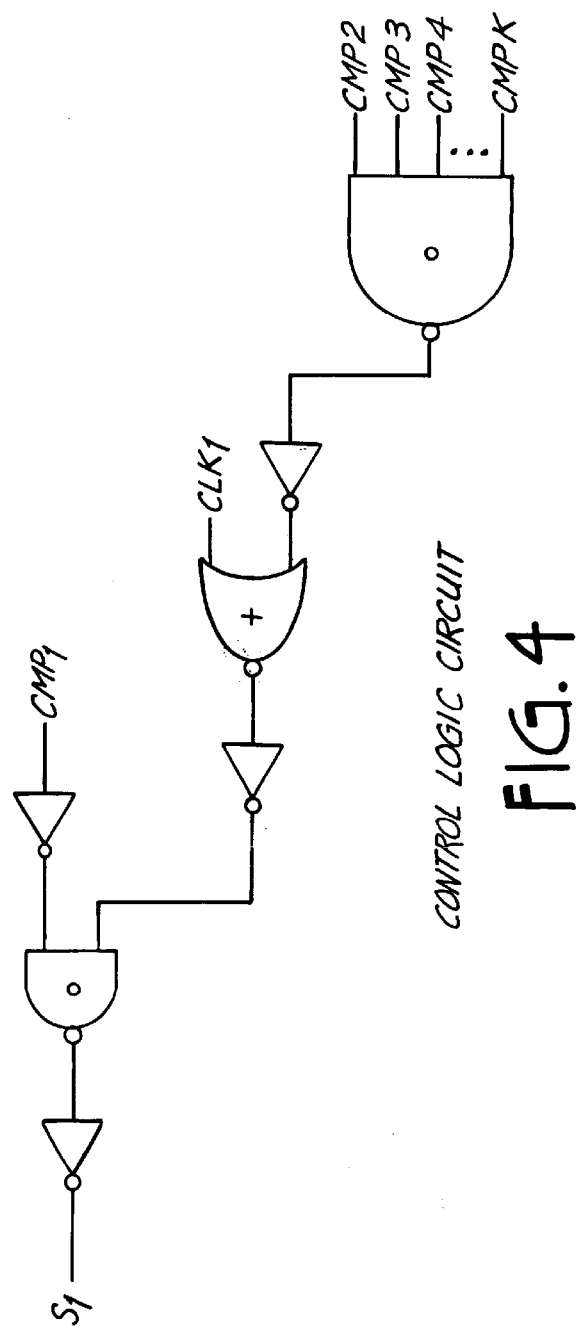
FIG. 4 is a logic diagram of an example of a control logic circuit for driving the switches, including an asynchronous override feature.

It may also be desirable to allow for asynchronous override of the clock cycle, for example, where only one distribution circuit 14 is heavily loaded. FIG. 4 shows a logic diagram of one embodiment of a control logic circuit for achieving asynchronous override with respect to the first distribution circuit and for normal control of switch $S_1$, where the operation of switch $S_1$ is a function of $cmp_1$, $clk_1$, and the values of $cmp_{2-k}$. In the illustrative embodiment of FIG. 4, $S_1$ will be activated (i.e. logical value 1) only when $cmp_1$ is low (i.e. $C_1$ needs charging), and either the clock cycle is at one or $cmp_{2-k}$ are all high (i.e. $C_{2-k}$ do not need charging). Similar logic is applied with respect to each switch, allowing for asynchronous override capabilities for each distribution circuit 14, along with normal switch operation.

It may be desirable to use a single-ended primary inductor converter (SEPIC) to serve as the current source 12. A single-ended primary inductor converter provides, inter alia, (1) buck or boost capability to accommodate input voltages that may be higher or lower than the output voltages; (2) inherently switchable output; (3) "smooth" input current for low power-line electromagnetic interference; and (4) optional input/output isolation for highly noise-sensitive loads, or for instances where the various outputs do not share a common ground, or where their ground is not in common with the source.

Figure 5:
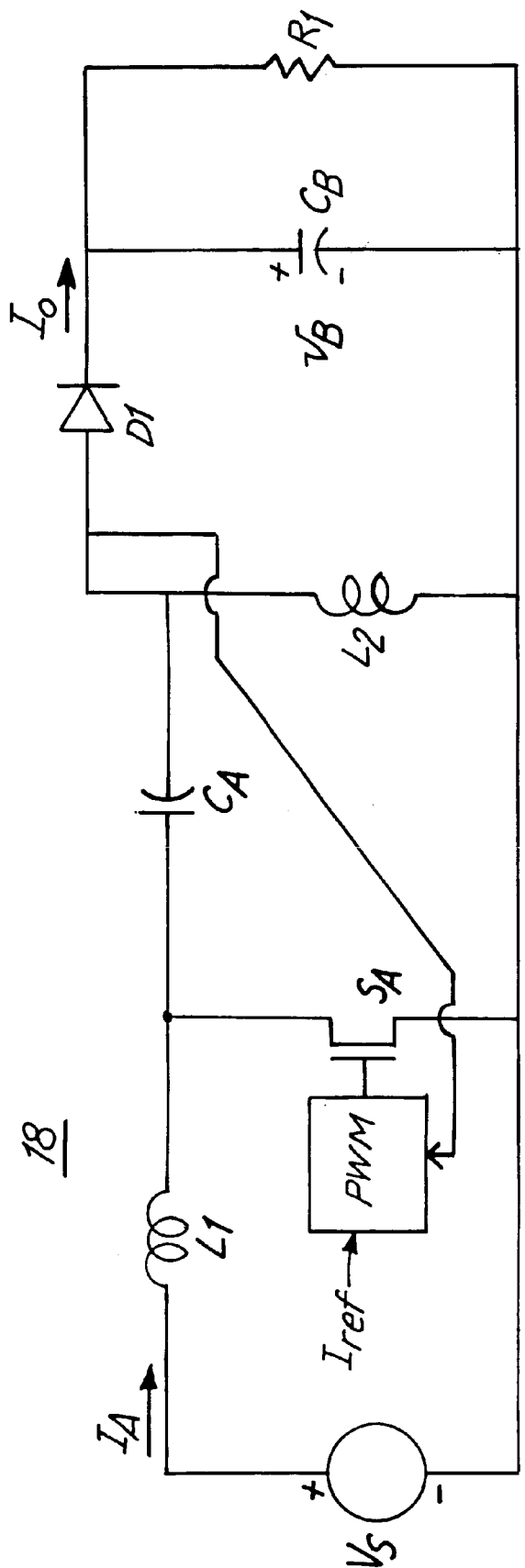
FIG. 5 is a schematic circuit diagram of an illustrative pulse-width modulator controlled single-ended primary inductor converter.

An example of a well-known single-ended primary inductor converter, generally designated as 18, is shown in FIG. 5. The basic single-ended primary inductor converter 18 includes a DC voltage supply $V_s$, inductors $L_1$ and $L_2$, capacitors $C_A$ and $C_B$, a diode $D_1$ for isolation of capacitor $C_B$ a resistor $R_1$, a transistor switch $S_A$, and a pulse width modulator PWM. The PWM can be any commonly known and available chip that compares the average current through $D_1$ to a reference current $I_{ref}$. A current transformer $T_1$ with appropriate reset means can be used to sense the output current through $D_1$. In the circuit shown, the voltage $V_B$ across capacitor $C_B$ is generally equal to $V_s(D)/(1-D)$, where D is the duty factor of the pulse width modulator PWM. When $S_A$ is off, the current output $I_O$ of the single-ended primary inductor converter is equal to $I_A$ (the current across $L_1$)/D. When $S_A$ is on, the current output $I_O$ is zero.

Figure 6:
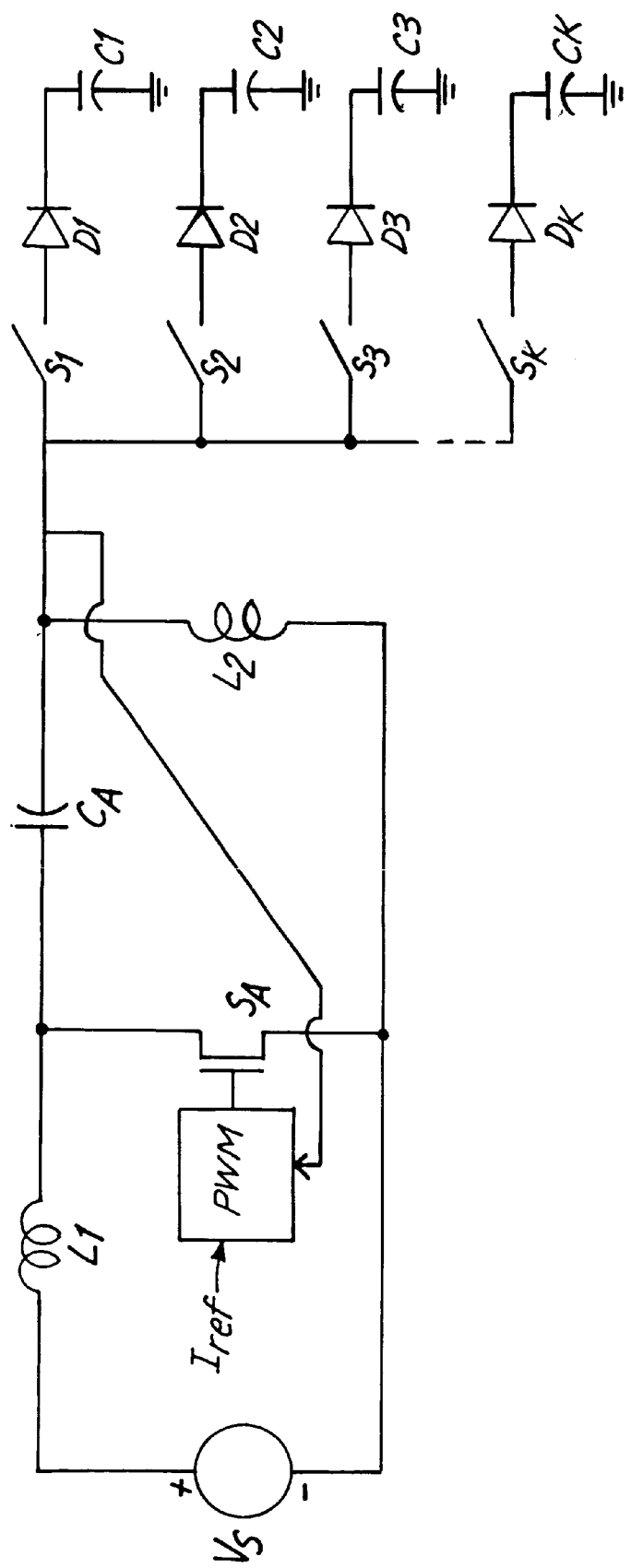
FIG. 6 is a schematic circuit diagram of an embodiment of the present invention utilizing a single-ended primary inductor converter as the current source.

The single-ended primary inductor converter 18 of FIG. 5 can be modified and utilized to serve as the current source 12 of FIGS. 1A and 1B in accordance with the present invention. FIG. 6 shows an embodiment of the present invention in which a single-ended primary inductor converter 18 is utilized as the current source 12. The distribution circuits 14 of FIG. 1B become part of the modified single-ended primary inductor converter 18 by including switches $S_{1-k}$ and capacitors $C_{1-k}$ of the distribution circuit 14 in the single-ended primary inductor converter 18. In the embodiment shown in FIG. 6, the switches $S_1$, $S_2$, and $S_3$ of distribution circuits 14 in FIGS. 1A and 1B become switches $S_{1-k}$. Diodes $D_{1-k}$ in the distribution circuit 14 perform the function of $D_1$ in FIG. 5. Schottky diodes may be used for $D_{1-k}$ since they generally provide a lower forward drop than bipolar diodes. Metal-oxide field-effect transistors (MOSFETs) may be used for switches $S_{1-k}$. The presence of the diodes $D_{1-k}$ reduces the concerns with situations in which multiple switches $S_{1-k}$ may be on at the same time due to a switching malfunction. Even if more than one switch were on at the same time, the charge in higher voltage capacitors will not be affected since the diode for the higher voltage capacitor will prevent discharge in the reverse direction.

Figure 7:
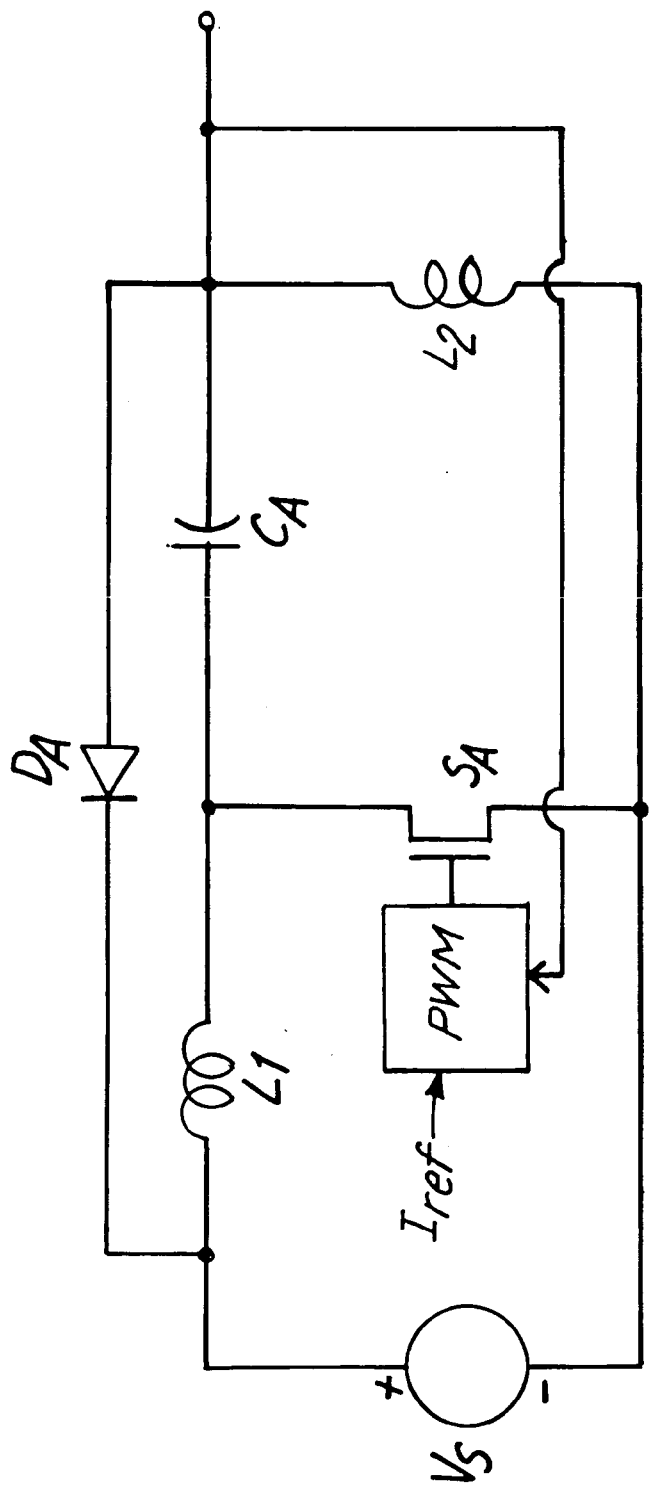
FIG. 7 is a schematic circuit diagram illustrating an example of a portion of the circuit in FIG. 6 with a return path diode serving as an energy return switch.

Referring to FIG. 7, the reliability of the current source may be enhanced and the possibility of damage to the power components may be reduced by providing a return path diode to the current source circuit. As shown, a diode $D_A$ can be connected across the inductor $L_1$ and the capacitor $C_A$ to provide a path for the current in the event that no output capacitors need charging or switching functions malfunction.

Figure 8:
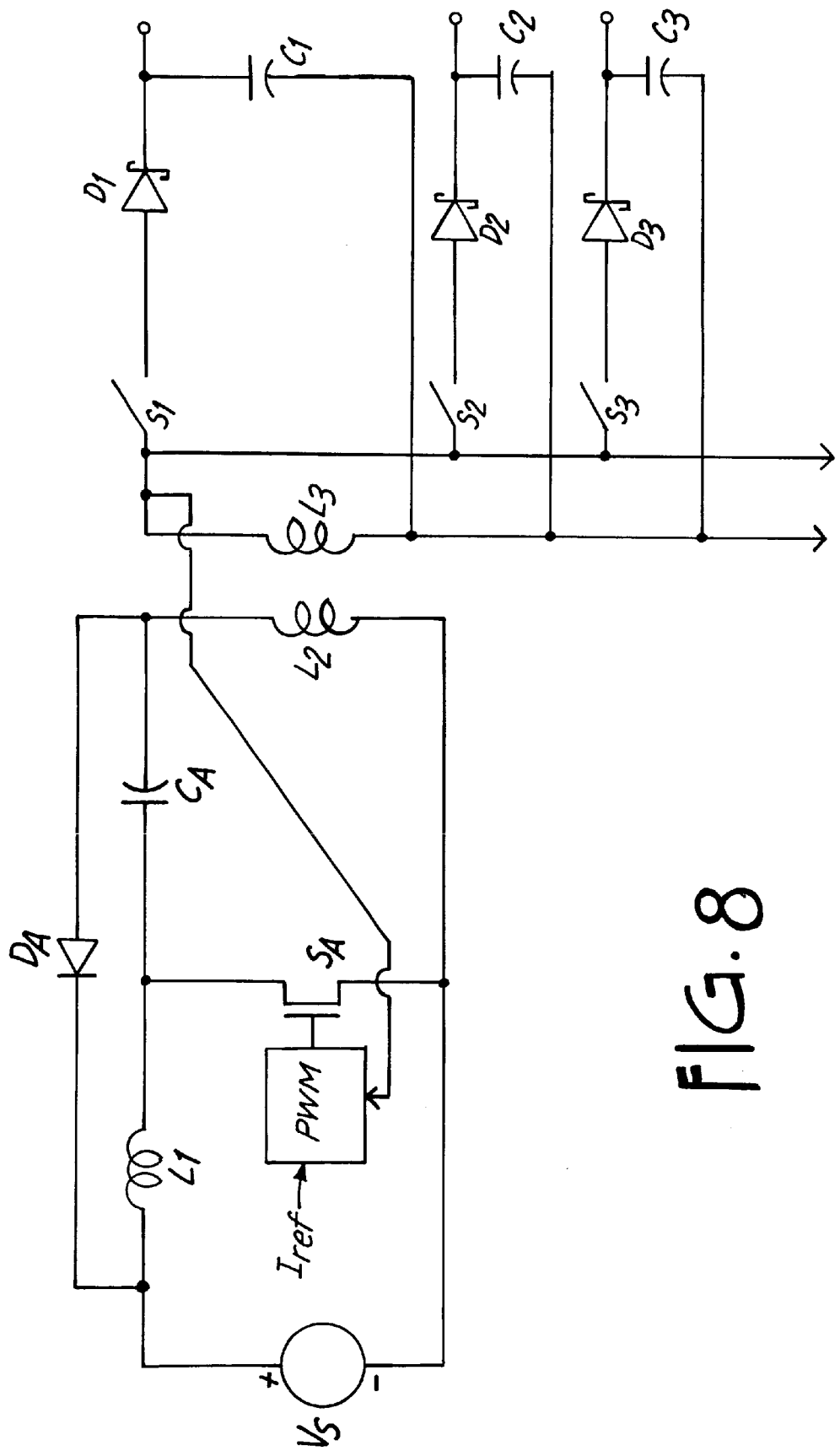
FIG. 8 is a schematic circuit diagram of another embodiment of the present invention with enhanced isolation of the distribution circuit.

As shown in FIG. 8, isolation of the distribution circuit 14 can be achieved by utilizing an additional winding $L_3$, essentially creating a transformer by which current is provided to the distribution circuit 14 and by which the distribution circuit 14 is isolated from electrical noise from the current source.

Figure 9:
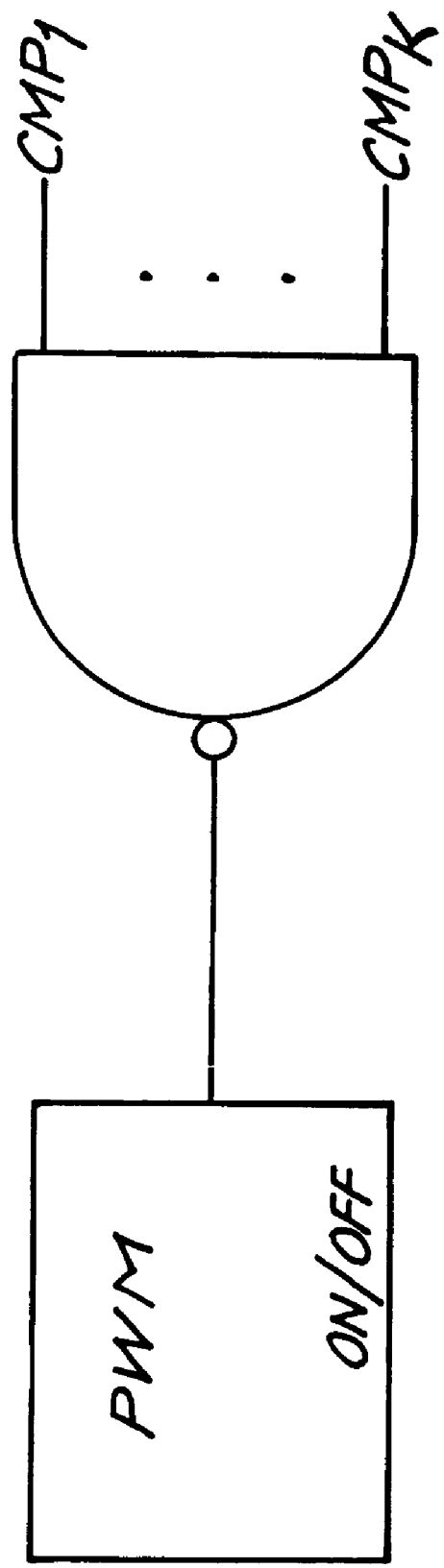
FIG. 9 is a logic diagram for controlling the state of an illustrative pulse-width modulator.

To further enhance power efficiency, the PWM of the single-ended primary inductor converter 18 may be turned off when the capacitors $C_{1-k}$ do not need charging, i.e. when $cmp_{1-k}$ are all at relative high states. One embodiment of a simple logic circuit for achieving this feature is shown in FIG. 9, where the PWM is on when its ON/OFF input is high.

While particular embodiments of the present invention have been shown and described, it will be appreciated by those skilled in the art that changes and modifications may be made thereto without departing from the invention as set forth in the following claims.

What is claimed is:

1. A power distribution system for delivering power to a plurality of loads comprising, in combination:
   a current source for supplying a charging current;
   a plurality of distribution circuits connected to the current source for distributing the charging current, the plurality of distribution circuits including energy storage devices for delivering power to the plurality of loads said energy storage devices connected in a parallel circuit arrangement with the current source, and switches connected between the energy storage devices and an output terminal of the current source; and
   a switch control for activation of the switches in the plurality of distribution circuits wherein said switch control further comprises a clock for providing sequential clock cycles for operation of the switches at a selected clock cycle frequency.

2. A power distribution system as described in claim 1 wherein the current source is a modified single-ended primary inductor converter.

3. The power distribution system of claim 2 wherein the modified single-ended primary inductor converter comprises:
   a voltage supply having an output terminal and a return terminal for supplying the charging current;
   a first inductor connected to the output terminal of the voltage supply;
   a switch connected to the first inductor and to the return terminal of the voltage supply;
   a first capacitor connected the switch and the first inductor;
   a second inductor connected to the capacitor and to the return terminal of the voltage supply;
   a current transformer connected to the first capacitor and the second inductor and to the switches in the plurality of distribution circuits for sensing the charging current; and
   a pulse width modulator connected to the switch and the current transformer for comparing the sensed charging current to a reference current and for driving the switch with a duty factor in accordance with the sensed charging current.

4. A power distribution system as described in claim 1 further comprising a plurality of diodes connected between the current source and the energy storage devices to prevent discharge in a reverse direction of the energy storage devices.

5. A power distribution system as described in claim 1 wherein the switch control includes:
   a plurality of comparators for comparing the predetermined voltages on the energy storage devices to reference voltages and for producing comparator output signals indicative of the predetermined voltage levels; and
   a plurality of control logic circuits connected to the clock and the plurality of comparators to produce switch activation signals when enabled by the sequential clock cycles and the comparator output signals.

6. A power distribution system for supplying predetermined voltages to a plurality of loads comprising, in combination:
   a modified single ended primary inductor converter for supplying a charging current;
   a plurality of switches connected to the modified single ended primary inductor converter for switching the charging current;
   a plurality of diodes connected to the plurality of switches for providing isolation;
   a plurality of energy storage devices connected to the plurality of diodes said energy storage devices being charged by the charging current; and
   a switch control for controlling the plurality of switches to charge the plurality of energy storage devices to the predetermined voltages.

7. A power distribution system as described in claim 6 wherein the energy storage device is a capacitor.

8. A power distribution system as described in claim 6 wherein the modified single-ended primary inductor converter comprises:
   a voltage supply having an output terminal and a return terminal for supplying the charging current;
   a first inductor connected to the output terminal of the voltage supply;
   a switch connected to the first inductor and to the return terminal of the voltage supply;
   a first capacitor connected the switch and the first inductor;
   a second inductor connected to the capacitor and to the return terminal of the voltage supply;
   a current transformer connected to the first capacitor and the second inductor and to the plurality of switches in the plurality of distribution circuits for sensing the charging current; and
   a pulse width modulator connected to the switch and the current transformer for comparing the sensed charging current to a reference current and for driving the switch with a duty factor in accordance with the sensed charging current.

9. A power distribution system as described in claim 6 wherein the switch control includes
   a clock for generating sequential clock cycles;
   a plurality of comparators for comparing the predetermined voltages on the plurality of energy storage devices to reference voltages and for producing a comparator output signal indicative of the predetermined voltage level; and
   a plurality of control logic circuits connected to the clock and the plurality of comparators to produce switch activation signals when enabled by the sequential clock cycles and the comparator output signals.

10. A method of distributing power to multiple loads, the method comprising, in combination:

supplying a charging current from a current source;

distributing the charging current to energy storage devices connected to the current source through switches connected between the energy storage devices and the current source;

activating the switches sequentially in accordance with sequential clock cycles from a switch control; and charging the energy storage devices to predetermined voltages with the charging current.

11. The method of claim 10 wherein the step of activating the switches further comprises the steps of:

comparing the predetermined voltages to predetermined reference voltages in comparator circuits;

generating the sequential clock cycles at a selected clock frequency with a clock in the switch control; and activating the switches sequentially when the predetermined voltages are less the predetermined reference voltages in accordance with the sequential clock cycles.

12. The method of claim 11 further comprising the step of asynchronously overriding the sequential order of charging when one of the energy storage devices is in need of charging and all other energy storage devices are not in need of charging.

13. The method of claim 12 further comprising allowing energy to return to the source when no energy storage devices are in need of charging through a return path switch.

14. The method of claim 13 where the return path switch is a diode.

* * * * *